(12) United States Patent
Park

(10) Patent No.: US 10,832,580 B2
(45) Date of Patent: Nov. 10, 2020

(54) COOPERATIVE DRIVING CONTROL DEVICE AND METHOD THEREFOR

(71) Applicant: MANDO CORPORATION, Pyeongtaek-si (KR)

(72) Inventor: Man Bok Park, Seoul (KR)

(73) Assignee: MANDO CORPORATION, Pyeongtaek-si (KR)

(*) Notice: Subject to any disclaimer, the term of this patent is extended or adjusted under 35 U.S.C. 154(b) by 223 days.

(21) Appl. No.: 16/137,185

(22) Filed: Sep. 20, 2018

(65) Prior Publication Data

US 2019/0096264 A1 Mar. 28, 2019

(30) Foreign Application Priority Data

Sep. 25, 2017 (KR) .................... 10-2017-0123763

(51) Int. Cl.
*G08G 1/00* (2006.01)
*B60K 31/00* (2006.01)
(52) U.S. Cl.
CPC ........... *G08G 1/22* (2013.01); *B60K 31/0058* (2013.01)

(58) Field of Classification Search
CPC ............................ G08G 1/22; B60K 31/0058
See application file for complete search history.

(56) References Cited

U.S. PATENT DOCUMENTS

| 8,311,720 | B2* | 11/2012 | Pelosse | B60W 30/16 |
| | | | | 123/349 |
| 10,077,050 | B2* | 9/2018 | Rajvanshi | G05D 1/021 |
| 2018/0225975 | A1* | 8/2018 | Park | G08G 1/052 |

* cited by examiner

*Primary Examiner* — Todd Melton
(74) *Attorney, Agent, or Firm* — Morgan, Lewis & Bockius LLP

(57) ABSTRACT

The present disclosure relates to a cooperative driving control technology, by which the set speed of an automatic cruise system of follower vehicles, other than a foremost vehicle, among cooperative driving vehicles is set to be higher by a certain value than the driving speed of the leader vehicle, and the headway time of a vehicle immediately after a departing vehicle is increased during a departure period of the follower vehicle, thereby enabling the departing vehicle to quickly and completely depart and preventing a collision between vehicles during the period.

10 Claims, 7 Drawing Sheets

COOPERATIVE DRIVING CONTROL DEVICE AND METHOD THEREFOR

CROSS REFERENCE TO RELATED APPLICATION

This application claims priority from Korean Patent Application No. 10-2017-0123763, filed on Sep. 25, 2017, which is hereby incorporated by reference for all purposes as if fully set forth herein.

BACKGROUND OF THE INVENTION

1. Field of the Invention

The present disclosure relates to a cooperative driving control technology and, more particularly, to a cooperative driving control method in the case where some vehicles depart from cooperative driving of a plurality of vehicles.

2. Description of the Prior Art

With the introduction of Information and Communication Technology (ICT) into vehicles, next-generation Cooperative Intelligent Transportation System (C-ITS) are being studied.

In transportation-advanced countries, various demonstration projects and services of C-ITS have been already presented. These services are largely classified into services providing traffic safety information closely related to traffic accidents and services providing driver convenience information.

Conventional development has focused on services limited to communication between vehicles and infrastructure using Wireless Access in Vehicular Environment (WAVE) technology developed for high-speed vehicles. That is, communication services are provided in a manner such that a Road-Side Unit (RSU) broadcasts information necessary for traffic to an On-Board Unit (OBU), or OBUs exchange data necessary for Internet service and the like.

However, to deal with increasing traffic and to maximize efficiency in use of a highway, vehicle platoon driving or vehicle cooperative driving technology, in which a plurality of vehicles travels as a group at a close distance, has been studied and developed recently.

Vehicle platoon driving or vehicle cooperative driving technology is a technique that enables a group of a plurality of follower vehicles including a leader vehicle to travel with successive vehicles closely together through the control of the distance between vehicles.

Here, the vehicle distance is maintained by the exchange of information on movements of the vehicles in the group and potential abnormal conditions through communication between vehicles and control based on the information.

Vehicles participating in cooperative driving may be represented as a cooperative driving group. Another vehicle may join the cooperative driving group by making a request for joining to a leader vehicle, whereas one of the follower vehicles in the group may depart from the cooperative driving group.

Cooperative driving is performed on the basis of an automatic cruise system, such as an Adaptive Cruise Control (ACC) system or a Smart Cruise Control (SCC) system enabling a vehicle to follow a preceding vehicle at a certain interval, among various Driving Assistance Systems (DASs) for vehicles.

The ACC system or SCC system enables the vehicle to follow the preceding vehicle on the basis of headway time or set distance but does not allow the vehicle to exceed a specified speed. To this end, the ACC system or SCC system needs to set a set speed and a distance to a preceding vehicle.

That is, the ACC system or SCC system senses the distance from the preceding vehicle and the speed relative to the preceding vehicle using a sensor of a vehicle, such as a radar sensor, and controls the speed of the vehicle such that the distance from the preceding vehicle or the headway time is constant.

As described above, since cooperative driving is based on ACC or the SCC, all vehicles included in a cooperative driving group need to set a set speed and a distance from a preceding vehicle. Generally, the distance may be determined by a command or an instruction from a leader vehicle during cooperative driving.

When a vehicle departs from cooperative driving, a vehicle immediately behind the departing vehicle accelerates to maintain the distance from a vehicle immediately before the departing vehicle. Here, when the departing vehicle does not completely depart from the cooperative driving group, the vehicle may be likely to collide with the back of the departing vehicle.

Further, the set speed of a vehicle in the group for cooperative driving needs to be set to a certain value, and accordingly it is necessary to provide an explicit criterion for the speed.

SUMMARY OF THE INVENTION

In this background, an aspect of an embodiment of the present disclosure is to provide a technology for preventing a collision between cooperative driving vehicles when a vehicle departs from a cooperative driving group.

Another aspect of the present disclosure is to provide a technology for preventing a collision of a vehicle departing from cooperative driving by controlling the headway setting of a vehicle immediately after the departing vehicle when the vehicle departs from cooperative driving of a leader vehicle and at least one follower vehicle at a certain interval.

Still another aspect of the present disclosure is to provide a technology for providing the departure convenience of a vehicle departing from cooperative driving and reducing the possibility of a collision of the vehicle during departure by setting the set speed of a follower vehicle included in a cooperative driving group to be higher by a certain value than the speed of the a leader vehicle.

To achieve the foregoing aspects, in accordance with an embodiment of the present disclosure, there is provided a cooperative driving control device that is a device for controlling vehicle cooperative driving of a cooperative driving group including a leader vehicle and at least one follower vehicle and is disposed in the leader vehicle, the device including: a set speed controller configured to generate a set speed indication message, which sets the set speed of an automatic cruise system of the follower vehicle included in the cooperative driving group to be higher by a first set value than the current driving speed of the leader vehicle, and to transmit the set speed indication message to the follower vehicle; and a departure controller configured to generate and transmit a headway time change request message, which sets the target headway time of a vehicle immediately after a departing vehicle to be longer than a default headway time for cooperative driving until departure is completed, when it is identified that one of the follower vehicle starts departing.

In accordance with another embodiment of the present disclosure, there is provided a cooperative driving control device that is a device for controlling vehicle cooperative driving of a cooperative driving group including a leader vehicle and at least one follower vehicle and is disposed in one of the follower vehicle, the device including: a set speed setter configured to set the set speed of an automatic cruise system to be higher by a first set value than the driving speed of the leader vehicle according to a set speed indication message when receiving the set speed indication message from the leader vehicle; and a headway time adjuster configured to set a target headway time to be longer than a default headway time for cooperative driving by the departure completion time of a departing vehicle that departs immediately ahead when receiving the headway time change request message from the leader vehicle.

In accordance with still another embodiment of the present disclosure, there is provided a cooperative driving control method by a cooperative driving control device disposed in a leader vehicle in a cooperative driving system for controlling vehicle cooperative driving of a cooperative driving group including the leader vehicle and at least one follower vehicle, the method including: generating and transmitting, to the follower vehicle, a set speed indication message, which sets the set speed of an automatic cruise system of the follower vehicle included in the cooperative driving group to be higher by a first set value than the current driving speed of the leader vehicle; identifying that one of the follower vehicle starts departing; and generating and transmitting a headway time change request message, which sets the target headway time of a vehicle immediately after a departing vehicle to be longer than a default headway time for cooperative driving until departure of the departing follower vehicle is completed.

As described below, according to an embodiment of the present disclosure, when a vehicle departs from cooperative driving of a leader vehicle and at least one follower vehicle at a certain interval, the headway setting of a vehicle immediately after the departing vehicle may be controlled, thereby preventing a collision of the vehicle departing from cooperative driving.

Further, the set speed of a follower vehicle included in a cooperative driving group is set to be higher by a certain value than the speed of the a leader vehicle, thereby providing the departure convenience of a vehicle departing from cooperative driving and reducing the possibility of a collision of the vehicle during departure.

Accordingly, according to the present disclosure, when a vehicle departs from cooperative driving, a collision between the departing vehicle and a remaining vehicle and a collision between remaining vehicles may be prevented, thereby improving the stability of a cooperative driving system.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
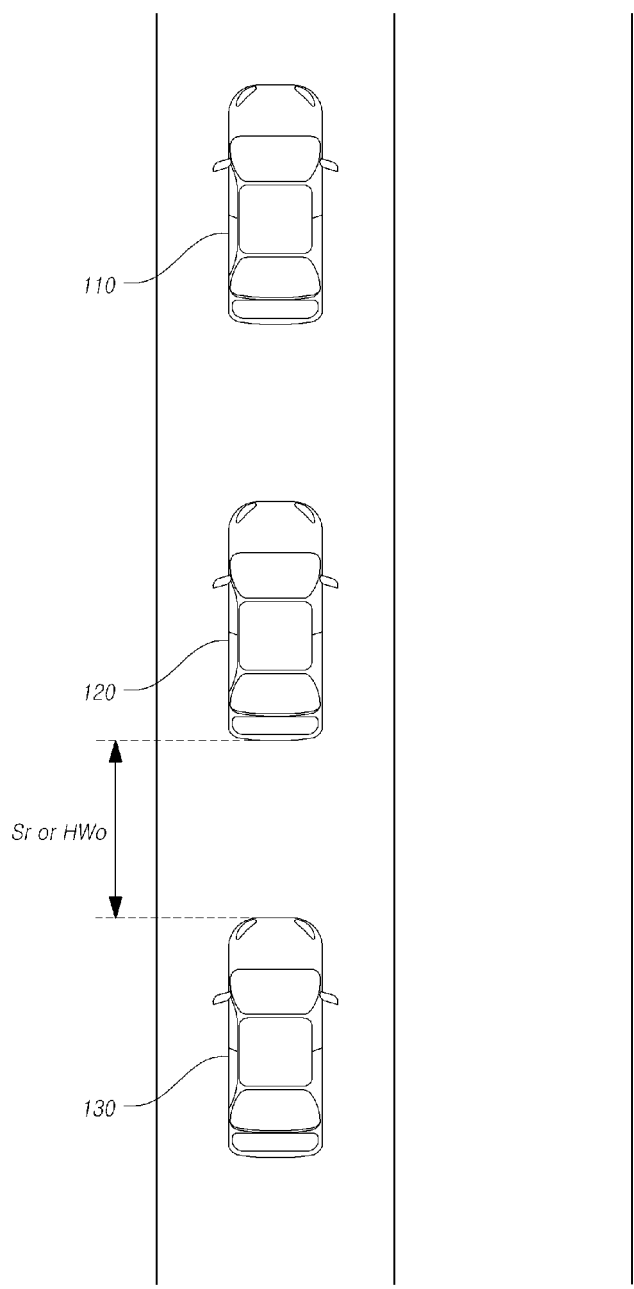
FIG. 1 schematically illustrates a normal cooperative driving state to which the present disclosure can be applied.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 schematically illustrates a cooperative driving state to which the present disclosure can be applied.

Cooperative driving of FIG. 1 shows that a total of n vehicles including a leader vehicle perform cooperative driving.

In the present specification, a total of n vehicles that perform cooperative driving are referred to as a cooperative driving group, one or more vehicles that control cooperative driving of the entire group among the vehicles in the cooperative driving group are referred to as a leader vehicle 110, and the other vehicles are referred to as follower vehicles 120 and 130.

Cooperative driving is a driving method that enables a total of n vehicles in a cooperative driving group including a leader vehicle 110 to be driven a certain distance apart in the same lane, thereby reducing not only fuel consumption but also traffic congestion.

The leader vehicle 110 may be at the head of the vehicles in the entire cooperative driving group but is not limited thereto. The leader vehicle 110 may be in the middle of the vehicles in the entire group or at any other position.

This leader vehicle 110 performs detection and determination of surrounding conditions necessary for cooperative driving, generates control data for each of the vehicles included in the cooperative driving group, and transmits the control data to the follower vehicles 120 and 130 included in the group.

The follower vehicles 120 and 130 autonomously operate an engine, a steering system, and a brake system using the control data transmitted from the leader vehicle, thereby being driven a certain distance apart from a preceding vehicle.

Here, a certain interval between the vehicles included in the cooperative driving group may be represented by distance, such as vehicle distance (Sr) or headway distance, or by time, such as Headway Time (HW) as the concept of Time-To-Collision (TTC).

In the present specification, vehicle distance during cooperative driving is represented by Sr and is expressed as headway time, $HW_0$.

In the present specification, the vehicle distance during cooperative driving is represented by vehicle distance Sr in length units and by headway time $HW_0$ in terms of time. Sr and $HW_0$ are different units but may be interpreted as having the same meaning.

In cooperative driving, a group of predetermined vehicles may perform cooperative driving from the start of driving, while a vehicle may join a cooperative driving group during driving.

A joining vehicle to join cooperative driving transmits a joining request to the leader vehicle, and the leader vehicle 110 may check the state of the other follower vehicle 120 and may instruct the joining vehicle to move towards the back of the currently last follower vehicle and to follow the last vehicle at an interval of a specified headway time $HW_0$.

On the other hand, a vehicle may depart from the cooperative driving group during cooperative driving.

Departing from cooperative driving may be performed voluntarily according to the intent of the driver of a follower vehicle or may be performed involuntarily due to a failure of communication with another vehicle, a vehicle system failure, or a driver's mistake.

Figure 2:
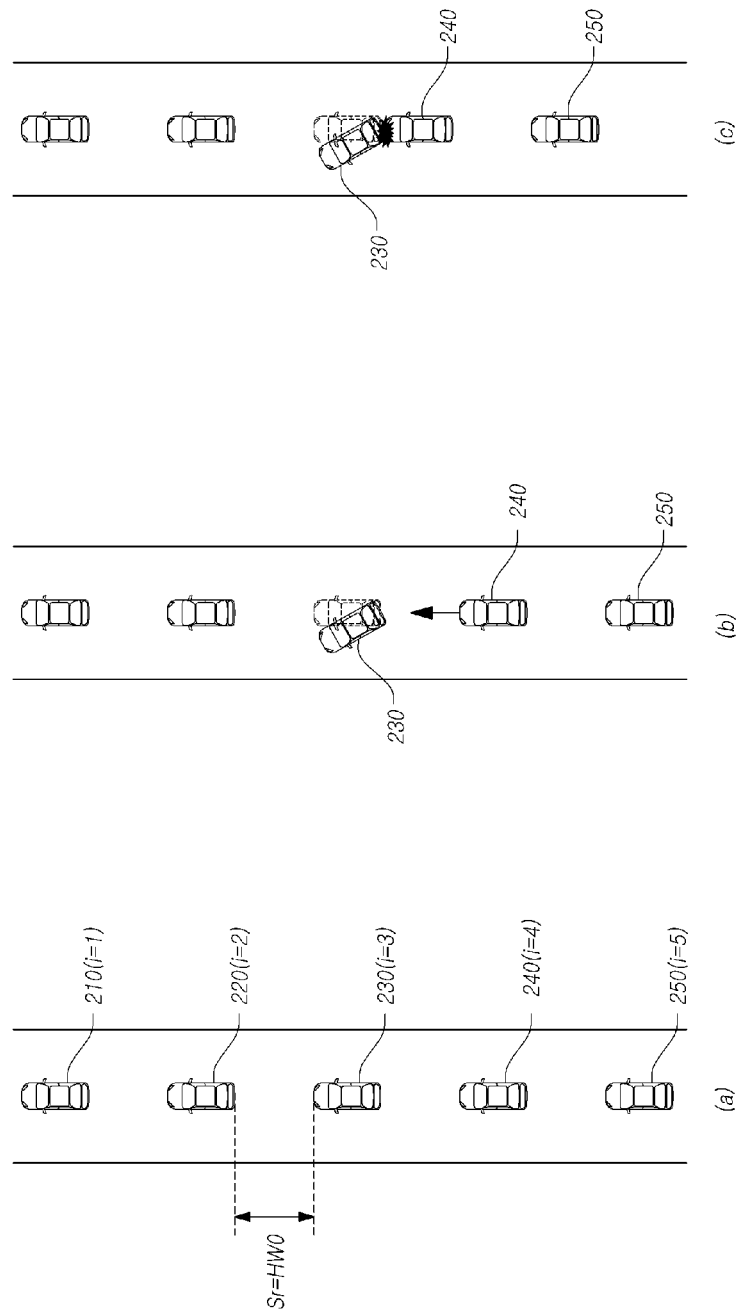
FIG. 2 illustrates a relationship between a departing vehicle and a remaining cooperative driving vehicle where the vehicle departs from normal cooperative driving.

FIG. 2 illustrates a relationship between a departing vehicle and a remaining cooperative driving vehicle where the vehicle departs from normal cooperative driving.

As illustrated in FIG. 2, it is assumed that while a leader vehicle 210 (i=1) is positioned at the head and performs cooperative driving with four follower vehicles 220 to 250 (i=2 to 5) following the leader vehicle, a follower vehicle 230 that is a third vehicle departs from cooperative driving.

Here, all the vehicles included in a cooperative driving group operate an automatic cruise system (Adaptive Cruise Control (ACC) system or Smart Cruise Control (SCC) system) thereof, thereby being positioned and driven at a certain interval according to headway time ($HW_0$) indicated by the leader vehicle.

In the present specification, ACC or SCC systems, which automatically control the speed of a vehicle according to the speed determined by the driver and additionally enable the vehicle to follow a preceding vehicle accordingly, are collectively referred to as an automatic cruise system.

The automatic cruise system (ACC or SCC system) of each vehicle needs to set a set speed, which is a constant driving speed, in addition to headway time. In a normal state, the set speed of the automatic cruise system is set directly by the driver. However, when the automatic cruise system controls a vehicle to follow a preceding vehicle, the set speed may not be set separately.

Therefore, in this cooperative driving, the automatic cruise systems of the follower vehicles 220 to 250 set the same headway time of $HW_0$, and the set speeds of the follower vehicles 220 to 250 may be separately determined for each vehicle or may not be separately determined.

Here, when the set speeds of the automatic cruise systems of the follower vehicles 220 to 250 are determined, the speeds may be a speed preset by the driver, the maximum speed on a corresponding driving road, or a cooperative driving speed (that is, the speed of the leader vehicle) received from the leader vehicle in cooperative driving.

In this state, when the follower vehicle 230 (i=3) driving at the third position departs from cooperative driving due to a system abnormality or the driver's mistake/intention as illustrated in (b) of FIG. 2, it occurs to a follower vehicle 240, which is a fourth cooperative driving vehicle immediately after the departing vehicle, that the follower vehicle 230, which is a followee vehicle and departing vehicle, deviates from the sensor detection range of the follower vehicle 240 at a time (t).

At this time, the follower vehicle 240 has a suddenly increased distance from the preceding vehicle. Since the target headway time to the preceding vehicle is already set to $HW_0$, the follower vehicle 240 rapidly accelerates within the set speed to meet the target headway time. The last follower vehicle 250 also rapidly accelerates to maintain the distance from the follower vehicle 240 as a preceding vehicle.

However, as illustrated in (c) of FIG. 2, when the proceeding follower vehicle 240 rapidly accelerates and thus the speed of the follower vehicle 240 is higher than the departing speed of the departing follower vehicle 230, the follower vehicle 240 as a following vehicle may approach the departing follower vehicle 230 and may be likely to collide with the back of the departing follower vehicle 230 before the departing follower vehicle 230 completely departs from the lane.

Particularly, in this case, when the set speed of each of the follower vehicles 220 to 250 is not set or is set to a high speed, such as a speed limit on a road, the possibility of a collision due to the foregoing rapid acceleration becomes higher.

On the other hand, when the set speed of the automatic cruise system of each of the follower vehicles 220 to 250 is set to the driving speed of the leader vehicle 210, the departing vehicle cannot quickly depart from cooperative driving since the departing vehicle cannot exceed the set speed.

In addition, after the departing vehicle completely departs, the follower vehicle 240, which follows the departing vehicle, needs to follow the follower vehicle 220. However, when the leader vehicle drives at the same speed, the follower vehicle 240 cannot accelerate over the set speed as the cooperative driving speed, making it difficult to narrow the distance from the preceding vehicle after departure.

As described above, when a vehicle departs from cooperative driving using an automatic cruise system (ACC or SCC system), if the set speed (Vs) and the target headway time (HWt) of each vehicle are not properly controlled, there is a difficulty or a risk of a collision between vehicles in cooperative driving.

Accordingly, in the cooperative driving system according to the present disclosure, the set speed of an automatic cruise system of a vehicle other than a foremost vehicle among vehicles included in a cooperative driving group is set to be higher than the driving speed ($V_L$) of a leader vehicle within a certain range, or, when a vehicle departs from cooperative driving, the target headway time of a vehicle immediately after the departing vehicle is set to be longer than a default headway time from departure start time to departure completion time, thereby solving the foregoing problems that may occur in the departure of a vehicle.

Figure 3:
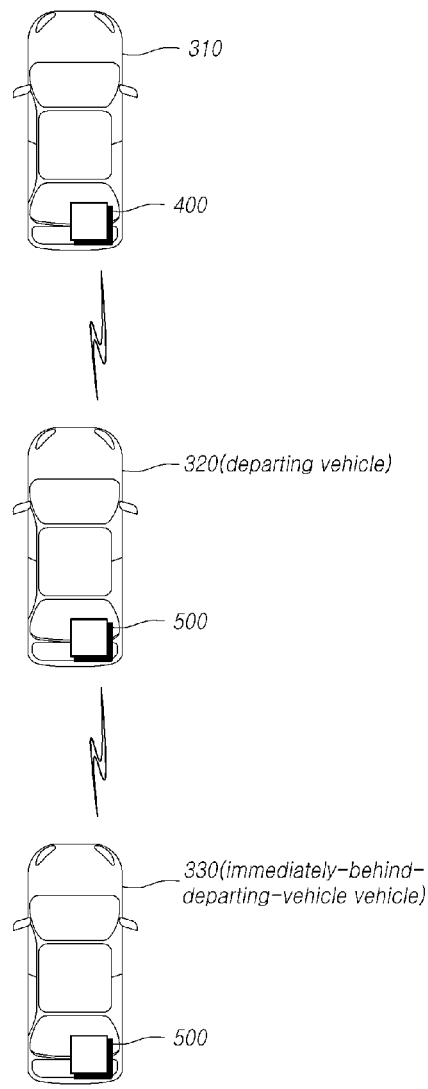
FIG. 3 illustrates the overall configuration of a cooperative driving system according to the present disclosure.

FIG. 3 illustrates the overall configuration of a cooperative driving system according to the present disclosure.

The cooperative driving system according to the present disclosure includes at least one leader vehicle 310 and at least one follower vehicle 320 or 330 that receives a control command from the leader vehicle and performs cooperative driving, in which all cooperative driving vehicles including the leader vehicle and the follower vehicle are referred to as a cooperative driving group.

For convenience, it is assumed that the leader vehicle 310 is positioned at the head, a first follower vehicle 320 of the follower vehicles is a departing vehicle that departs from cooperative driving, and a second follower vehicle 330 of the follower vehicles is an immediately-behind-departing-vehicle vehicle that is positioned immediately after the departing vehicle.

However, the present disclosure is not necessarily limited to this case, and, in particular, the leader vehicle does not necessarily need to be positioned at the head.

Further, in a normal cooperative driving state, the speed of the leader vehicle and the speeds of all the cooperative driving vehicles in the group are represented by $V_L$, and headway time indicating vehicle distance in terms of time is represented by a default headway time $HW_0$.

According to the present disclosure, in this state, when one follower vehicle 320 departs from cooperative driving, for safe departing, the leader vehicle 310 properly sets the set speed (Vs) of an automatic cruise system of all the follower vehicles and controls the target headway time of the vehicle 330 immediately after the departing vehicle to be properly changed in process of departing.

According to the present disclosure, the leader vehicle 310 has a leader-vehicle cooperative driving control device 400 disposed inside, and the follower vehicles 320 and 330 have a follower-vehicle cooperative driving control device 500 disposed inside.

Although the leader-vehicle cooperative driving control device 400 and the follower-vehicle cooperative driving control device 500 may be configured as separate hardware and software to be mounted in the leader vehicle and the follower vehicle, but the same may also be included as a single module in an existing vehicle control system.

More specifically, the leader-vehicle cooperative driving control device 400 disposed inside the leader vehicle 310 has a function of generating a set speed indication message, which sets the set speed (Vs) of the automatic cruise system of the follower vehicle included in the cooperative driving group to be higher by a first set value (α) than the current driving speed ($V_L$) of the leader vehicle, and transmitting the set speed indication message to the follower vehicle.

Here, it is preferable that the first set value (α) is determined to be about 5 to 10% of the current driving speed ($V_L$) of the leader vehicle.

All the vehicles included in the cooperative driving system according to the present disclosure include an automatic cruise system, such as ACC or SCC system, inside, and the set speed Vs of the automatic cruise system in all the follower vehicles other than the leader vehicle disposed at the head is set according to the following equation.

$$Vs=V_L+\alpha \qquad \text{[Equation 1]}$$

Here, $V_L$ is the current driving speed of the leader vehicle and the driving speed of all the vehicles included in the cooperative driving group in the normal state, and α is the first set value, which is about 5 to 10% of the current driving speed ($V_L$) of the leader vehicle.

When the set speed (Vs) of the automatic cruise system of all the vehicles included in the cooperative driving group excluding the leading vehicle is set to be higher by a certain value than the speed of the leader vehicle, the departing vehicle can quickly and safely complete departing from the group and the vehicle immediately after the departing vehicle can safely change to the normal cooperative driving state after the departing vehicle departs from the group.

Figure 6:
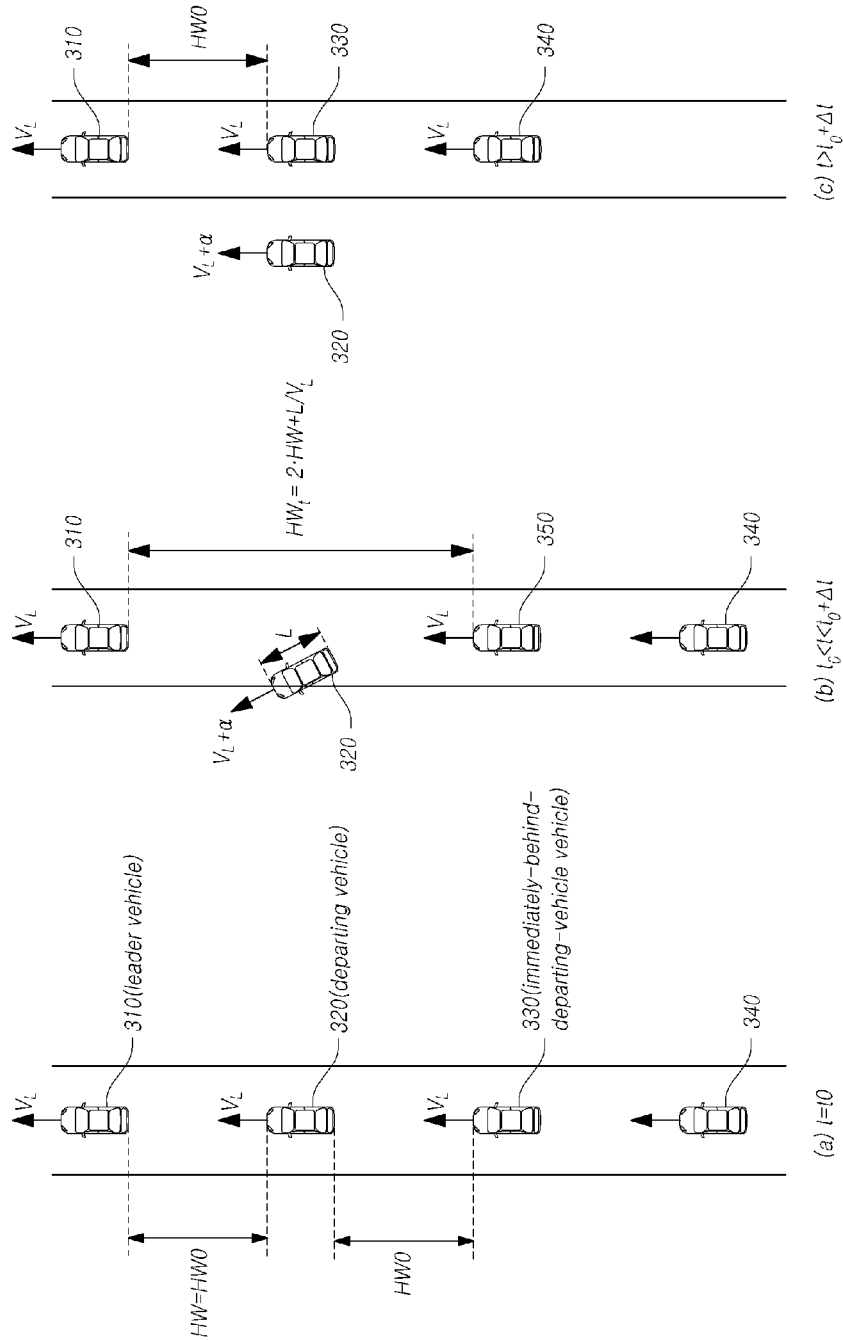
FIG. 6 illustrates a vehicle arrangement relationship before and after the departure of a departing vehicle in the case where a cooperative driving control method is applied according to the present disclosure.

When the first set value (α), which is the difference between the set speed (Vs) of the automatic cruise system and the vehicle speed ($V_L$) of the leader vehicle, is 5% or less of the speed of the leader vehicle, there is a limitation in reducing the departing time of the departing vehicle and the vehicle immediately after the departing vehicle may have a delay in returning to the cooperative driving state after the departing vehicle completes departing from the group, which will be described with reference to FIG. 6.

When the first set value (α) is 10% or greater of the speed of the leader vehicle, the departing speed of the departing vehicle is rapidly increased, and thus the departing vehicle may be likely to collide with a vehicle on an adjacent lane.

Therefore, in an embodiment of the present disclosure, the first set value (α), which is the difference between the set speed (Vs) of the automatic cruise system and the vehicle speed ($V_L$) of the leader vehicle, is optimized to 5 to 10% of the speed of the leader vehicle, thereby minimizing the foregoing problems.

This effect will be described in more detail below with reference to FIG. 6.

Further, in addition to the foregoing set speed control function, the leader-vehicle cooperative driving control device 400 may further include a function of setting the target headway time of the vehicle immediately after the departing vehicle to be longer than a default headway time in cooperative driving until departure is completed when it is identified that one of the follower vehicles starts to depart.

Specifically, the target headway time (HWt) of the vehicle immediately after the departing vehicle may be set to be twice or more the default headway time ($HW_0$), which is the vehicle distance in normal cooperative driving, until the preceding vehicle completes departing.

Preferably, the target headway time (HWt) for the vehicle immediately after the departing vehicle from the start of departure of the preceding vehicle to the completion of departure may be determined by Equation 2.

$$HWt=2*HW_0+L/V_L \qquad \text{[Equation 2]}$$

Here, $HW_0$ is the default headway time in normal cooperative driving, L is the vehicle length of the departing vehicle, and $V_L$ is the current driving speed of the leader vehicle and the driving speed of all the vehicles included in the cooperative driving group in the normal state.

The leader-vehicle cooperative driving control device 400 may generate a headway time return message to restore the target headway time (HWt) to the default headway time ($HW_0$) and may transmit the message to the vehicle immediately after the departing vehicle after the departure of the departing vehicle is completed.

As such, when the target headway time is maintained to be twice or more the default headway time during the departure process of a preceding vehicle, if one of the follower vehicles departs from cooperative driving, it is possible to prevent a collision between vehicles due to the acceleration of the following vehicle.

On the other hand, when the target headway time (HWt) of the vehicle immediately after the departing vehicle is set to be twice or less the default headway time (HW$_0$) in the departing process, the vehicle immediately after the departing vehicle may accelerate to approach the leader vehicle before departure is completed.

Therefore, when proximity cooperative driving is performed with a short default headway time set, the vehicle immediately after the departing vehicle may be likely to collide with the back of the departing vehicle before the departing vehicle completely departs.

In the present disclosure, the target headway time of the vehicle immediately after the departing vehicle is set to be twice or more the default headway time during the departure period, thereby thoroughly eliminating the possibility of a collision that may occur in the departure process.

Figure 4:
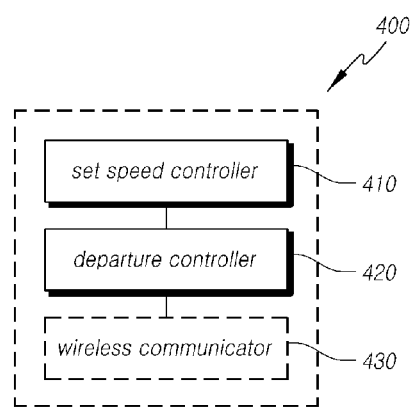
FIG. 4 is a functional block diagram illustrating a cooperative driving control device included in a leader vehicle of a cooperative driving system according to the present disclosure.
Figure 5:
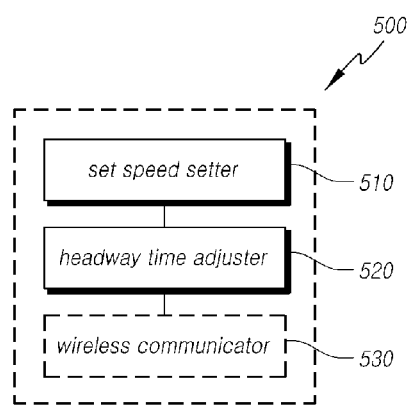
FIG. 5 is a functional block diagram illustrating a cooperative driving control device in a follower vehicle of a cooperative driving system according to the present disclosure.

FIG. 4 is a functional block diagram illustrating a cooperative driving control device included in a leader vehicle of a cooperative driving system according to the present disclosure, and FIG. 5 is a functional block diagram illustrating a cooperative driving control device in a follower vehicle of a cooperative driving system according to the present disclosure.

As illustrated in FIG. 4, the cooperative driving control device 400 included in the leader vehicle may include a set speed controller 410 and a departure controller 420, and may further include a wireless communicator 430.

The set speed controller 410 generates a set speed indication message, which sets the set speed (Vs) of an automatic cruise system of all vehicles, other than a foremost vehicle, included in a cooperative driving group to be higher by a first set value ($\alpha$) than the current driving speed (V$_L$) of the leader vehicle, and transmits the set speed indication message to a follower vehicle.

When it is identified that one of the follower vehicles starts to depart, the departure controller 420 performs a function of generating a headway time change request message, which sets the target headway time (HWt) of a vehicle immediately after the departing vehicle to be longer than a default headway time (HW$_0$) for cooperative driving until departure is completed and of transmitting the headway time change request message to the follower vehicle.

Further, the cooperative driving control device 400 of the leader vehicle may further include the wireless communication unit 430 that receives data, such as identification information and driving information on a follower vehicle, from the follower vehicle and transmits a generated set speed indication message and a generated headway time change message to the follower vehicle.

One of various vehicle-to-everything (V2X) communication methods currently developed may be used for data transmission and reception between the leader vehicle and the follower vehicles.

As an example of V2X communication, an IEEE 802.11p standard is used as a wireless communication technology in a physical layer, a Carrier Sense Multiple Access/Collision Avoidance (CSMA/CA) protocol is used in an MAC layer, and a communication method employing Platoon Multicast is used in a network layer. However, the present disclosure is not limited to the foregoing examples and may employ any wireless communication technology that enables transmission and reception of information between a leader vehicle and a follower vehicle.

When a follower vehicle is determined, the set speed controller 410 may broadcast identification information on the follower vehicle and information on the set speed (Vs) of an automatic cruise system of the follower vehicle, which is set to be higher by the first set value ($\alpha$) than the current driving speed (V$_L$) of the leader vehicle. A cooperative driving control device 500 of the follower vehicle receiving the foregoing information sets the set speed of an automatic cruise system of the follower vehicle to Vs on the basis of the received information.

Further, when an additional vehicle joins cooperative driving, the set speed controller 410 may also transmit the set speed indicating message having the same content to the joining vehicle.

The departure controller 420 may receive a departure request message from one of the follower vehicles participating in cooperative driving, thereby identifying whether the vehicle starts departing, or may identify the driving state of a departing vehicle or may receive driving state information from the vehicle, thereby identifying whether the vehicle starts departing.

That is, when a departing vehicle normally departs as intended by the driver, the departing vehicle transmits a departure request message to the leader vehicle. The leader vehicle can identify which follower vehicle departs upon receiving the departure request message, and can determine a vehicle proceeding immediately after the departing vehicle as an immediately-behind-departing-vehicle vehicle by recognizing all the follower vehicles participating in cooperative driving.

However, when one of the follower vehicles unintentionally departs due to a communication failure or a system failure, it is possible to detect the departing vehicle using a sensor mounted on the leader vehicle or to determine the departing vehicle on the basis of driving information transmitted from another follower vehicle.

When the departure of one of the follower vehicles is sensed, the departure controller 420 may determine the time as a departure start time (t0), may generate a headway time change request message, which is an instruction to change a currently set default headway time (HW$_0$) to target headway time (HWt) having a greater value, and may transmit the headway time change request message to an immediately-behind-departing-vehicle vehicle 330.

Here, the headway time change request message may specifically include target headway time (HWt) information together with an identifier of the immediately-behind-departing-vehicle vehicle.

However, the headway time change message does not necessarily include the target headway time (HWt) information. Instead, it is possible to transmit only an indicator indicating a change of headway time along with identification information on a vehicle whose headway time needs to be changed, in which case a cooperative driving control device 500 of the follower vehicle receiving the indicator may set a predetermined target headway time HWt.

The departure controller 420 identifies that the departure of the departing vehicle is completed by receiving a departure completion message from the departing vehicle 320, by autonomous sensing, or by receiving driving information from another vehicle.

In the present specification, for convenience, departure start time is represented by t0, a departure period during which a departure process is performed is represented by $\Delta$t, and a departure completion time is represented by t0+$\Delta$t.

When the departure of the departing vehicle is completed, the departure controller 420 may generate and transmit a headway time return message to restore the headway time of the immediately-behind-departing-vehicle vehicle 330 to a default headway time (HW$_0$), which is the headway time of the entire cooperative driving group at departure release time.

When a vehicle is detected ahead, an automatic cruise system mounted inside a cooperative driving vehicle according to the present disclosure operates in a following mode of maintaining vehicle distance on the basis of preset headway time. When a vehicle is not detected ahead, the automatic cruise system allows driving at constant speed in accordance with the set speed (Vs) of the automatic cruise system.

Accordingly, the immediately-behind-departing-vehicle vehicle 330 receiving the headway time return message accelerates within the set speed (Vs) set above to approach the leader vehicle 310, thereby adjusting the vehicle distance from the leader vehicle to the default headway time.

As described above, when one of the follower vehicles departs, the departure controller 420 included in the cooperative driving control device 400 of the leader vehicle may set the headway time of the immediately-behind-departing-vehicle vehicle 330 during the departure period (Δt) to the target headway time (HWt), which is longer than the default headway time (HW$_0$). Then, when the departure of the departing vehicle is completed, the departure controller 420 may restore the headway time of the immediately-behind-departing-vehicle vehicle 330 to the default headway time. Accordingly, it is possible to prevent a collision between vehicles when the follower vehicle departs.

As illustrated in FIG. 5, the follower-vehicle side cooperative driving control device 500 disposed in the follower vehicles 320 and 330 may include a set speed (Vs) setter 510, a headway time adjuster 520, and a wireless communicator 530.

When the set speed indication message is received from the leader vehicle 310, the set speed setter 510 performs a function of setting the set speed (Vs) of the automatic cruise system to be higher by the first set value than the driving speed (V$_L$) of the leader vehicle according to the set speed indication message.

When the headway time change request message is received from the leader vehicle, the headway time adjuster 520 performs a function of setting the target headway time (HWt) to be longer than the default headway time (HW$_0$) for cooperative driving by the departure completion time (t0+Δt) of the departing vehicle 320 that departs immediately ahead.

FIG. 6 illustrates a vehicle arrangement relationship before and after the departure of a departing vehicle in the case where a cooperative driving control method is applied according to the present disclosure.

(a) of FIG. 6 illustrates a normal cooperative driving state, (b) of FIG. 6 illustrates a departure period in which one 320 of follower vehicles departs, and (c) of FIG. 6 illustrates a departure completion state.

In the normal cooperative driving state illustrated in (a) of FIG. 6, all of a leader vehicle 310, a first follower vehicle 320, and a second follower vehicle 330 drive at the same speed as the driving speed V$_L$ of the leader vehicle and at a distance of a default headway time HW$_0$.

Here, the set speed of an automatic cruise system of the leader vehicle is set to V$_L$, while the set speed of an automatic cruise system of the other follower vehicles 320 and 330 is set to be higher by a first set value (α) than V$_L$ (Vs=V$_L$+α).

In this state, when one 320 of the follower vehicles departs as illustrated in (b) of FIG. 6, the heading angle of the departing vehicle 320 deviates from the lane, so that the departing vehicle 320 cannot detect the leader vehicle traveling ahead.

Accordingly, the departing vehicle 320 cannot perform following control or cooperative driving according to the headway time and thus changes the mode to a normal automatic cruise system.

When the departing vehicle 320 changes the mode to the normal automatic cruise system after starting to depart, the departing vehicle 320 accelerates at the preset set speed Vs of the automatic cruise system and quickly departs from a cooperative driving group.

When identifying that the departing vehicle 320 has started to depart, the leader vehicle 310 checks the immediately-behind-departing-vehicle vehicle 330 and transmits a headway time change message, which changes the headway time from the default headway time (HW$_0$) to a target headway time (HWt) that is twice or more the default headway time, to the immediately-behind-departing-vehicle vehicle 330.

Upon receiving the headway time change message, a cooperative driving control device of the immediately-behind-departing-vehicle vehicle 330 sets the headway time to the target headway time (HWt=2*HW$_0$+L/V$_L$) until the departure is completed, thereby controlling the vehicle 330 not to approach the leader vehicle 310 in front of the departing vehicle until the departure is completed.

When the departure of the vehicle 320 is completed, the immediately-behind-departing-vehicle vehicle 330 restores the headway time to the default headway time (HW$_0$) for current cooperative driving according to a headway time return message from the leader vehicle.

Then, as illustrated in (c) of FIG. 6, the vehicle 330 increases the vehicle speed within the set speed (Vs) and thus approaches the leader vehicle, and the vehicle distance is maintained at the default headway time for cooperative driving, thereby restoring the normal cooperative driving state with the departing vehicle excluded.

According to the cooperative driving control method of the present disclosure, the set speed of an automatic cruise system of follower vehicles, other than a foremost vehicle, among cooperative driving vehicles is set to be higher by a certain value than the driving speed of the leader vehicle, and the headway time of a vehicle immediately after a departing vehicle is increased during a departure period of the follower vehicle, thereby enabling the departing vehicle to quickly and completely depart and preventing a collision between vehicles during the period.

Figure 7:
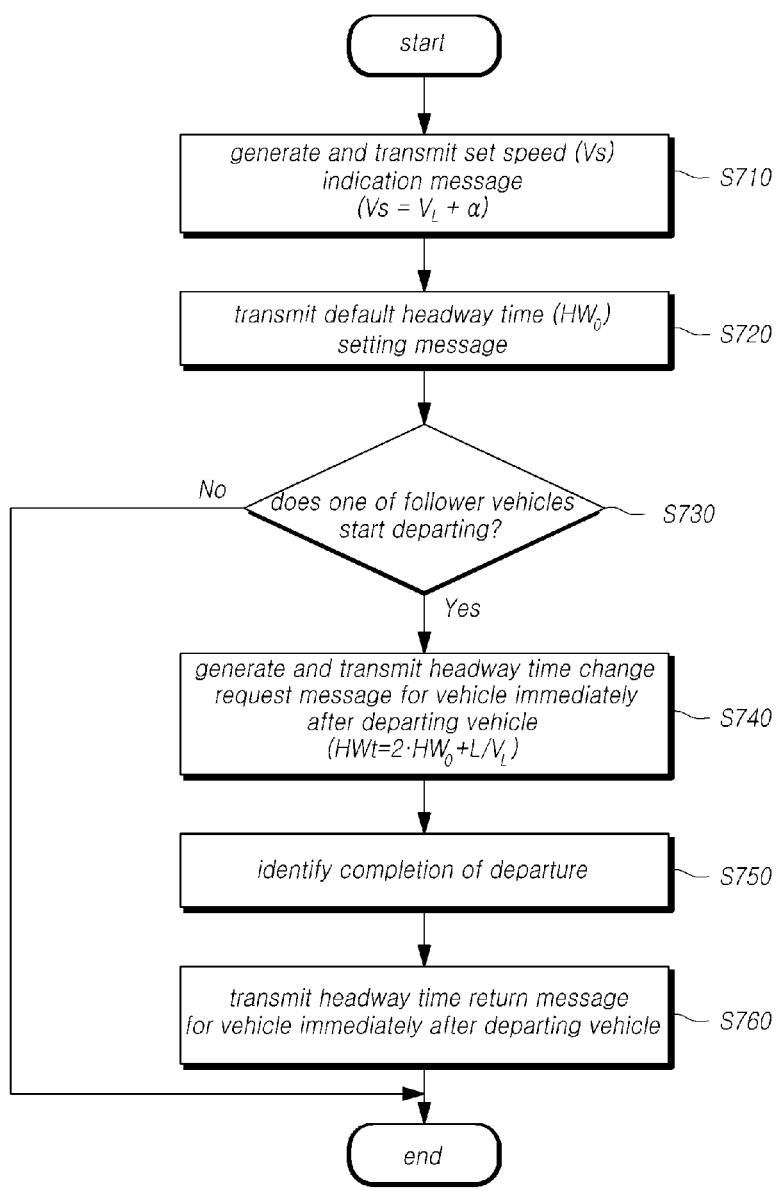
FIG. 7 illustrates the overall flow of a cooperative driving control method according to the present disclosure.

FIG. 7 illustrates the overall flow of a cooperative driving control method according to the present disclosure.

As illustrated in FIG. 7, the cooperative driving control method according to the present disclosure provides a control method for the case where one of follower vehicles departs from cooperative driving.

Hereinafter, the flow of the cooperative driving control method is described from the perspective of a leader-vehicle cooperative driving control device 400 disposed in the leader vehicle.

First, when cooperative driving starts, the leader-vehicle cooperative driving control device 400 generates a set speed indication message, which sets the set speed (Vs) of an automatic cruise system of all vehicles, other than a foremost vehicle, included in a cooperative driving group to be higher by a first set value (α) than the driving speed (V$_L$) of the leader vehicle, and transmits the set speed indication message to a follower vehicle (S710).

Further, simultaneously or sequentially with operation S710, the leader-vehicle cooperative driving control device 400 transmits a message for setting a default headway time (HW$_0$) as a vehicle distance during cooperative driving, thereby controlling all the follower vehicles participating in cooperative driving to drive at the same vehicle distance (S720).

Operation S710 of transmitting the set speed instruction message and operation S720 of transmitting a default headway time setting message may be performed in reverse order or may be simultaneously performed by transmitting a single message.

Next, the leader-vehicle cooperative driving control device 400 determines whether one of the follower vehicles departs from cooperative driving (S730).

The leader-vehicle cooperative driving control device 400 may determine whether the departure starts by receiving a departure request message from the departing vehicle, by detecting the departure using a sensor, or by receiving and analyzing driving information from another following vehicle.

When it is determined that the departure has started, the leader-vehicle cooperative drive control device 400 checks a vehicle immediately after the departing vehicle, generates a headway time change message, which is a request to change the headway time from a default headway time (HW$_0$) to a target headway time (HWt) that is twice or more the default headway time, and transmits the message to the immediately following vehicle (S740).

The headway time change message may include a target headway time (HWt) value, identification information on the immediately following vehicle, or identification information on the departing vehicle.

Next, the leader-vehicle cooperative driving control device 400 identifies that the departure of the departing vehicle has been completed (S750), generates a headway time return message to restore the headway time from the target headway time to the default headway time for current cooperative driving, and transmits the message to the vehicle immediately after the departing vehicle (S760).

According to the cooperative driving control method of the present disclosure, the set speed of an automatic cruise system of follower vehicles, other than a foremost vehicle, among cooperative driving vehicles is set to be higher by a certain value than the driving speed of the leader vehicle, and the headway time of a vehicle immediately after a departing vehicle is increased during a departure period of the follower vehicle, thereby enabling the departing vehicle to quickly and completely depart and preventing a collision between vehicles during the period.

Specifically, in cooperative driving, the set speed (Vs) of an automatic cruise system of all vehicles, other than the foremost vehicle, in a cooperative driving group is set to be higher by a certain value than the speed of the leader vehicle, thereby enabling a departing vehicle to quickly and safely depart and enabling a vehicle immediately after the departing vehicle to safely change to the normal cooperative driving state after the departure.

Further, a target headway time that is at least twice the default headway time is maintained during the departure process of a preceding vehicle, thereby preventing a collision between vehicles due to the acceleration of a vehicle following a departing vehicle when one of the follower vehicles departs.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A cooperative driving control device that is a device for controlling vehicle cooperative driving of a cooperative driving group comprising a leader vehicle and at least one follower vehicle and is disposed in the leader vehicle, the device comprising:
    a set speed controller configured to generate a set speed indication message, which sets a set speed of an automatic cruise system of the follower vehicle comprised in the cooperative driving group to be higher by a first set value than a current driving speed of the leader vehicle, and to transmit the set speed indication message to the follower vehicle; and
    a departure controller configured to generate and transmit a headway time change request message, which sets a target headway time of a vehicle immediately after a departing vehicle to be longer than a default headway time for cooperative driving until departure is completed, when it is identified that one of the follower vehicle starts departing.

2. The device of claim 1, wherein the target headway time is twice or more the default headway time.

3. The device of claim 2, wherein the first set value is 5 to 10% of the current driving speed of the leader vehicle.

4. A cooperative driving control device that is a device for controlling vehicle cooperative driving of a cooperative driving group comprising a leader vehicle and at least one follower vehicle and is disposed in one of the follower vehicle, the device comprising:
    a set speed setter configured to set a set speed of an automatic cruise system to be higher by a first set value than a driving speed of the leader vehicle according to a set speed indication message when receiving the set speed indication message from the leader vehicle; and
    a headway time adjuster configured to set a target headway time to be longer than a default headway time for cooperative driving by a departure completion time of a departing vehicle that departs immediately ahead when receiving the headway time change request message from the leader vehicle.

5. The device of claim 4, wherein the target headway time is twice or more the default headway time.

6. The device of claim 5, wherein the first set value is 5 to 10% of the current driving speed of the leader vehicle.

7. A cooperative driving control method by a cooperative driving control device disposed in a leader vehicle in a cooperative driving system for controlling vehicle cooperative driving of a cooperative driving group comprising the leader vehicle and at least one follower vehicle, the method comprising:
    generating and transmitting, to the follower vehicle, a set speed indication message, which sets a set speed of an automatic cruise system of the follower vehicle comprised in the cooperative driving group to be higher by a first set value than a current driving speed of the leader vehicle;

identifying that one of the follower vehicle starts departing; and generating and transmitting a headway time change request message, which sets a target headway time of a vehicle immediately after a departing vehicle to be longer than a default headway time for cooperative driving until departure of the departing follower vehicle is completed.

8. The method of claim 7, further comprising:

generating and transmitting a headway time return message to restore the target headway time of the vehicle immediately after the departing vehicle to the default headway time for cooperative driving immediately after the departure is completed.

9. The method of claim 8, wherein the target headway time is twice or more the default headway time.

10. The method of claim 9, wherein the first set value is 5 to 10% of the current driving speed of the leader vehicle.

* * * * *